(12) United States Patent
Paleczny et al.

(10) Patent No.: US 7,478,119 B2
(45) Date of Patent: Jan. 13, 2009

(54) SYSTEM AND METHOD FOR TRANSPOSING MEMORY PATTERNS WITHIN THE PHYSICAL MEMORY SPACE

(75) Inventors: Michael H. Paleczny, San Jose, CA (US); Olaf Manczak, Hayward, CA (US); Christopher A. Vick, San Jose, CA (US); Jay R. Freeman, Palo Alto, CA (US); Phyllis E. Gustafson, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 263 days.

(21) Appl. No.: 11/480,703

(22) Filed: Jul. 3, 2006

(65) Prior Publication Data

US 2008/0005526 A1 Jan. 3, 2008

(51) Int. Cl.
*G06F 12/00* (2006.01)
(52) U.S. Cl. .................. 707/206; 707/205; 711/170; 711/173; 711/202
(58) Field of Classification Search ......... 711/201–203, 711/206, 212, 170, 173; 707/205, 206
See application file for complete search history.

(56) References Cited

U.S. PATENT DOCUMENTS

| | | | | |
|---|---|---|---|---|
| 5,625,797 A | * | 4/1997 | Ferry et al. ............ | 711/214 |
| 5,774,409 A | * | 6/1998 | Yamazaki et al. ...... | 365/230.03 |
| 6,829,694 B2 | * | 12/2004 | Stein et al. ............ | 711/206 |
| 6,907,494 B2 | * | 6/2005 | Arimilli et al. ........ | 711/5 |
| 2004/0181635 A1 | * | 9/2004 | Huras et al. ........... | 711/151 |
| 2007/0143568 A1 | * | 6/2007 | Gould ................... | 711/203 |

* cited by examiner

*Primary Examiner*—Hong Kim
(74) *Attorney, Agent, or Firm*—Osha•Liang L.L.P.

(57) ABSTRACT

A system for mapping memory of a computer system includes a sorter, a partitioner, and a mapper. The sorter sorts a physical memory space to obtain a sorted virtual memory space, where the physical memory space includes a plurality of memory patterns, wherein each of the plurality of memory patterns is associated with a physical device and includes at least one memory block, wherein the at least one memory block is contiguous and addressable, and the plurality of memory patterns are arranged based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns. The partitioner partitions the plurality of memory patterns in the sorted memory space based on a partition size to obtain a partitioned virtual memory space, and a mapper transposes the partitioned virtual memory space to obtain a system memory space used by the computer system.

18 Claims, 8 Drawing Sheets

SYSTEM AND METHOD FOR TRANSPOSING MEMORY PATTERNS WITHIN THE PHYSICAL MEMORY SPACE

BACKGROUND

A modern computer system often contains many different types of devices. A device is a physical component within the computer system. Sometimes, it is also referred to as a "physical device" for clarity, to indicate that the component exists in the real world. For example, monitors, mice, printers, disk drives, processors, hard drives, and graphic cards are different types of physical devices. In other words, devices are the "hardware" of the computer system.

Some types of devices, such as processors, memory cards, or graphic cards, contain memory within themselves. In general, memory refers to the internal storage areas within the computer system, where data are stored. Conceptually, there are two main categories of memory: physical memory and virtual memory. Physical memory refers to storage areas contained within the physical devices, such as memory chips, that are capable of holding data. In contrast, virtual memory refers to imaginary memory areas supported by the operating system in conjunction with the hardware in the computer system for enlarging the amount of memory software programs can use. Furthermore, virtual memory offers access protection, multiple virtual locations of a single physical copy, and provides the appearance that a larger memory space exists.

All memory within a computer system is collectively referred to as a "memory space." All physical memory within the computer system is collectively referred to as a physical memory space. All virtual memory within the computer system is collectively referred to as a virtual memory space.

On the physical side, devices that contain physical memory typically are associated with some types of memory chips, such as random-access memory (RAM). Data may be both read from and written into RAM. Traditionally, a device has one or more memory "slots" that the memory chips can connect to. Some newer types of devices do not require the memory chips to be in actual physical contact with the memory slots.

Although a device may contain multiple memory slots, not all of the available memory slots are necessarily populated with the memory chips. This may be due to various reasons, such as cost concerns, memory chips availability, device architecture, etc. For example, assume a device may contain sufficient number of memory slots such that at a maximum, the device may contain 1,024 megabytes (1 megabyte=1,048, 576 bytes) of physical memory. It is possible that the slots for all 1,024 megabytes of memory are populated with the memory chips.

However, it is equally possible that only a portion of the slots for the 1,024 megabytes of memory, for example, 512 megabytes or 768 megabytes, is actually populated with the memory chips, and the rest are empty.

Assume a computer system contains five of the devices described above, where each device may possibly contain up to 1,024 megabytes of physical memory. However, only the first 768 megabytes within each device are actually populated with the memory chips, and the remaining 256 megabytes are empty. These five devices are then lined up side by side. Thus, the physical memory space of this computer system contains five contiguous segments of physical memory of 768 megabytes each, separated by five empty gaps, or "holes," of 256 megabytes each.

The above example is over-simplified to illustrate the concept of gaps or holes in a physical memory space. Computer systems have advanced significantly over the years. They grow in size and complexity: multi-processors, multi-tier architectures, distributed systems, etc. Modern computer systems may contain thousands of different types of devices, many of which contain various amounts of physical memory.

Extending the above example to a grand scale, assume instead of five devices that contain memory, the computer system in the above example actually contains 5,000 or 50,000 such devices. The physical memory space of this system contains thousands or tens of thousands of segments of memory separated by gaps or holes. Further, a single device may contain multiple segments of memory, separated by gaps. For example, the device described above may contain a 256-megabyte memory segment, followed by a 128-megabyte gap, followed by another 512-megabyte memory segment, and finally followed by another 128-megabyte gap. The result is a significant increase the number of gaps or holes in the physical memory space.

SUMMARY

In general, in one aspect, the invention relates to a system for mapping memory of a computer system. The system comprises a sorter for sorting the plurality of memory patterns in the physical memory space based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns, a partitioner for partitioning the plurality of memory patterns in the sorted memory space based on a partition size to obtain a partitioned memory space, and a mapper for transposing the partitioned virtual memory space to obtain a system memory space used by the computer system.

In general, in one aspect, the invention relates to a computer system. The computer system comprises a physical memory space that includes a plurality of memory patterns, wherein each of the plurality of memory patterns is associated with a physical device and that includes at least one memory block, wherein the at least one memory block is contiguous and addressable, and a processor for executing instructions to group the plurality of memory patterns with a same pattern of the at least one memory block in the physical memory space, sort the plurality of memory patterns in the physical memory space based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns, partition the plurality of memory patterns in the sorted memory space based on a partition size to obtain a partitioned memory space, and transpose the partitioned virtual memory space to obtain a system memory space used by the computer system.

In general, in one aspect, the invention relates to a computer readable medium. The computer readable medium comprises software instructions to group a plurality of memory patterns with a same pattern of at least one memory block in a physical memory space, wherein each of the plurality of memory patterns is associated with a physical device and that includes at least one memory block, wherein the at least one memory block is contiguous and addressable, sort the plurality of memory patterns in the physical memory space based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns, partition the plurality of memory patterns in the sorted memory space based on a partition size to obtain a partitioned memory space, and transpose the partitioned virtual memory space to obtain a system memory space.

Other aspects of the invention will be apparent from the following description and the appended claims.

DETAILED DESCRIPTION

Figure 1:
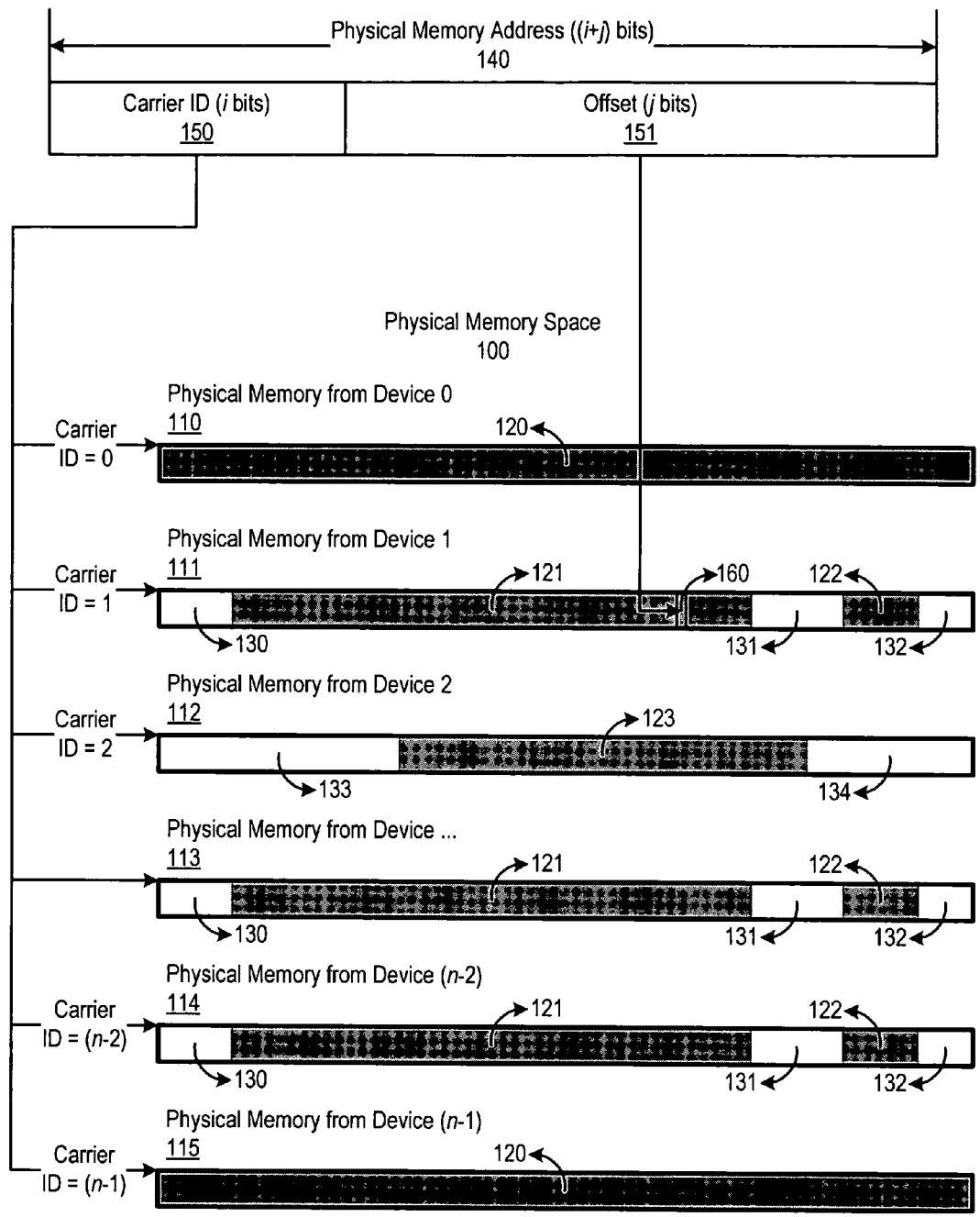
FIG. 1 illustrates a generic physical memory space and a generic format of physical memory address.

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

By convention, indexing for computer related objects generally begins at zero. In other words, the index for the first object is zero, the index for the second object is 1, and so forth. Thus, in general, the index for the $n^{th}$ object is n−1, where n represents an integer. The following description of the instant invention follows this convention when identifying various objects within a computer system.

In general, one or more embodiments of the invention relate a system for mapping a physical memory space of a computer system into a system memory space for the purpose of decreasing the number of gaps and increasing the sizes of the contiguous segments of memory in the system memory space and thus permitting the operating system for the computer system to use larger page sizes. More specifically, one or more embodiments of the invention relate to grouping, sorting, partitioning, and transposing the memory patterns within the physical memory space to obtain the system memory space.

The memory patterns in the physical space are grouped such that same memory patterns are grouped together. The memory patterns are sorted according to the largest memory block within each memory pattern. One skilled in the art will appreciate that the sorting mechanism is just one of many possible mechanisms to achieve availability of large contiguous memory ranges and regularity of hole or memory locations. The memory patterns are partitioned into individual partitions based on a fixed partition size. All partitions are transposed to obtain the system memory space, which is then used by the computer system. Furthermore, physical memory addresses are translated into virtual memory addresses and virtual memory addresses are translated into physical memory addresses based on respective algorithms.

A typical computer system contains a number of devices. A device is a physical component, or a piece of hardware, within the computer system. Each of the devices of interest in this invention contains an addressable memory block. Some of these devices contain physical memory. Physical memory is the memory areas contained within a device that is capable of storing data. Memory cards, graphic cards, and processors are examples of devices that contain physical memory. All physical memory within the computer system is collectively referred to as the physical memory space of the computer system. Thus, the physical memory space contains all the physical memory from all the devices that contain physical memory.

Recall from the description above that devices containing memory may have one or more memory slots, where the memory chips can connect. Recall also that not all the available slots on the devices are necessarily populated with the memory chips, and those slots not populated or filled with the memory chips form gaps or holes within the physical memory space. A contiguous segment of memory within a device is called a "memory block." In other words, a memory block is one or more consecutive memory slots on a device populated with memory chips and without gaps in between.

Sometimes, certain types of devices may contain physical memory, but choose not to export either a portion or all of them, usually because such devices want or need to manage and use these portions of physical memory themselves. In a sense, these un-exported portions of physical memory are "hidden" from the operating system. Thus, they are ignored and excluded from the system's physical memory space. For the instance invention, the un-exported portions of physical memory may be treated the same as empty gaps or holes.

To clarify, the physical memory space contains exported physical memory from one or more physical devices in a computer system. Each device contains at least one contiguous memory block. All the memory blocks within a device form a memory pattern for that device. Thus, the physical memory space contains more than one memory pattern.

In contrast, virtual memory is the imaginary storage areas use by the operating system to enlarge the amount of memory software programs can use, and all virtual memory within the computer system is collectively referred to as the virtual memory space of the computer system.

Every location within the memory space has a unique numerical address, called a "memory address," assigned to it. Those memory locations that have unique memory addresses assigned to are referred to as "addressable" memory locations. Physical memory locations have physical memory addresses, or physical addresses for short. Virtual memory locations have virtual memory addresses, or virtual addresses for short. The base unit for memory is "byte." To visualize, one may imagine the computer memory as a sequence of storage units, where each unit is 1 byte in size and is assigned a unique address. The operating system and the software programs use these memory addresses to access different memory locations (storage units), to read data from certain locations or to write data to certain locations.

Software programs may store instructions and data in virtual memory addresses, which are stored in physical memory. When a particular program is actually executed or run, the operating system correlates the virtual memory addresses where the program's instructions and data are stored with a set of physical memory addresses. In doing so, the physical memory locations identified by the physical memory addresses and the virtual memory locations identified by the virtual memory addresses are also correlated. The instructions and data stored in virtual memory are then copied from physical storage devices into the physical memory locations indicated by the set of physical memory addresses. The process of translating between the virtual memory space and the physical memory space, between correlating virtual and physical locations, or between correlating virtual and physical memory addresses is called "mapping."

While the following description specifically focuses on enlarging the amount of memory when the application cannot fit into physical memory, the invention applies whether the application fits into physical memory or not. To enlarge the amount of memory the program can use, instead of copying the entire set of instructions and data of the program from virtual memory into physical memory at once, only the portion of the instructions and data that are needed at any given moment during the execution of the program are copied into physical memory, overwriting those instructions and data that are no longer needed. In other words, those instructions and data that are needed are swapped (paged if part of process, swap for whole process) into physical memory, while those instructions and data that are not needed are swapped out of physical memory. This way, software programs that require large amounts of virtual memory can be executed on a computer system with a limited amount of available physical memory.

To illustrate, assume a software program's entire set of instructions and data requires 512 megabytes of virtual memory space. When executing this program on a computer system, if all the instructions and data are copied to physical memory at once, the computer system needs to have at least 512 megabytes of available physical memory space, that is, physical memory space not presently used by the operating system or other concurrently executing programs. However, if at any given time, the program only uses less than 128 megabytes of instructions and data stored in virtual memory, then, by using the swapping method described above, the computer system only needs to have 128 megabytes of available physical memory space in order to execute the program. The operating system only copies those 128 megabytes of instructions and data that are presently needed into physical memory. Once some instructions or data are no longer needed, the operating system swaps out these unneeded instructions or data and copies new instructions or data into their place in physical memory.

To facilitate the process of copying instructions and data stored from virtual memory to physical memory, the operating system divides the virtual memory space into "pages," where each page contains a fixed number of virtual memory locations. Thus, conceptually, the virtual memory space contains some number of pages, each page contains a fixed number of virtual memory locations, and each virtual memory location is assigned a unique numerical virtual memory address.

The operating system copies one or more pages from virtual memory to physical memory at a time. The copying from virtual pages to physical memory is known as "paging" or "swapping." Since a page of virtual memory is contiguous, the page size is limited by the size of the contiguous segments of memory in physical memory, because for each copying or paging operation, the amount of contiguous virtual memory copied must "fit" within a contiguous segment of physical memory. Thus, small contiguous segments of physical memory force the operating system to use small page sizes and perform many paging operations during the execution of the program.

FIG. 1 illustrates a generic physical memory space and a generic format of physical memory address. Note that this is merely a visual representation of the physical memory space. The physical memory space (100) in this particular computer system contains physical memory from n devices, where n represents an integer greater than zero. These devices have exported either a portion or all of their physical memory. For each device, the outer rectangular boundary indicates the maximum amount of physical memory the device is capable of containing. The gray area(s) indicate the amount and position of physical memory the device actually contains. In other words, some type of memory is exported by the device. The white area(s) indicate the gaps or holes within the device, where there is no physical memory or the physical memory has not been exported by the device.

Therefore, in FIG. 1, two devices, device zero (110) and device n−1 (115), have all of their slots (120) populated with physical memory and there is no gap. Three devices, device 1 (111), device . . . (113), and device n−2 (114) have only two portions (121, 122) of their slots populated with physical memory and there are three gaps (130, 131, 132). Finally, device 2 (112) has the middle portion (123) of its slots populated with physical memory and there are two gaps (133, 134).

Recall that a contiguous segment of memory within a device is called a "memory block." In other words, a memory block is a segment of memory without gaps. Therefore, in FIG. 1, device zero (110) and device n−1 (115) contain one memory block (120), device 1 (111), device . . . (113), and device n−2 (114) contain two memory blocks (121, 122), and device 2 (112) contains one memory block (123).

Visualizing the memory blocks and gaps in FIG. 1, it is not difficult to recognize three distinct patterns for the arrangement of memory blocks and gaps from the devices. Device zero (110) and device n−1 (115) have the same pattern of physical memory: a memory block (120) that populates the entire available physical memory. Device 1 (111), device . . . (113), and device n−2 (114) have the same pattern of physical memory: a small gap (130), followed by a large memory block (121), followed by a small gap (131), followed by a small memory block (122), and lastly followed by a small gap (132). Device 2 (112) has the third pattern of physical memory by itself: a relatively larger gap (133), followed by a memory block (123), and followed by a relatively smaller gap (124). Therefore, a memory pattern is the arrangement, including the number, size, and position, of all the memory blocks within a device.

Recall, from the discussion above, that every location within the memory space has a unique numerical address, called "memory address." The operating system and the software programs use these memory addresses to access specific locations within the memory space, to read data from or write data to these locations. In a large computer system with multiple memory devices, a memory address typically contains a carrier identification (ID) (which is merely one form of device identification) and an offset. Recall that the base unit for memory is a "byte." Thus, for a specific memory location, i.e., a specific byte of memory, within the memory space, the carrier ID identifies which device contains the memory location or the byte of memory, and the offset indicates exactly where within that device the memory location or the byte of memory is located.

To illustrate, FIG. 1 shows a physical memory address (140) with i bits of carrier ID (150), where i represents an integer greater than zero, and j bits of offset (151), where j represents an integer greater than zero. Thus, the memory address (140) has a total of i+j bits. Note that conventionally, the rightmost bit in a memory address is bit zero.

Assume that a particular byte (160) on device 1 (111) needs to be identified. First, the carrier ID is set to 1 to indicate device 1. Next, the offset is set to where the byte (160) is located within device 1 (111). The offset for the first byte within a device is zero, the offset for the second byte is 1, and so forth. Thus, in general, the offset for the $n^{th}$ byte is n−1, where n represents an integer. Assume that the particular byte (160) is the $2,048^{th}$ byte within device 1. Then, the offset for this byte would be 2,047.

The carrier ID (150) must contain sufficient number of bits, i, to be able to uniquely identify all the devices within the physical memory space (100). In FIG. 1, there are n devices within the physical memory space (100). Therefore, the carrier ID (150) must contain enough number of bits such that $2^i > n$. Of course, the carrier ID (150) can have more bits than necessary.

The offset (151) must contain enough number of bits, j, to be able to uniquely identify all the available locations, i.e., bytes, within a device. Assume in FIG. 1, the maximum number of bytes within any device is m, where m represents an integer greater than zero. Then, the offset (151) must contain enough number of bits such that $2^j > m$. Of course, the offset (151) can also have more bits than necessary.

Figure 2:
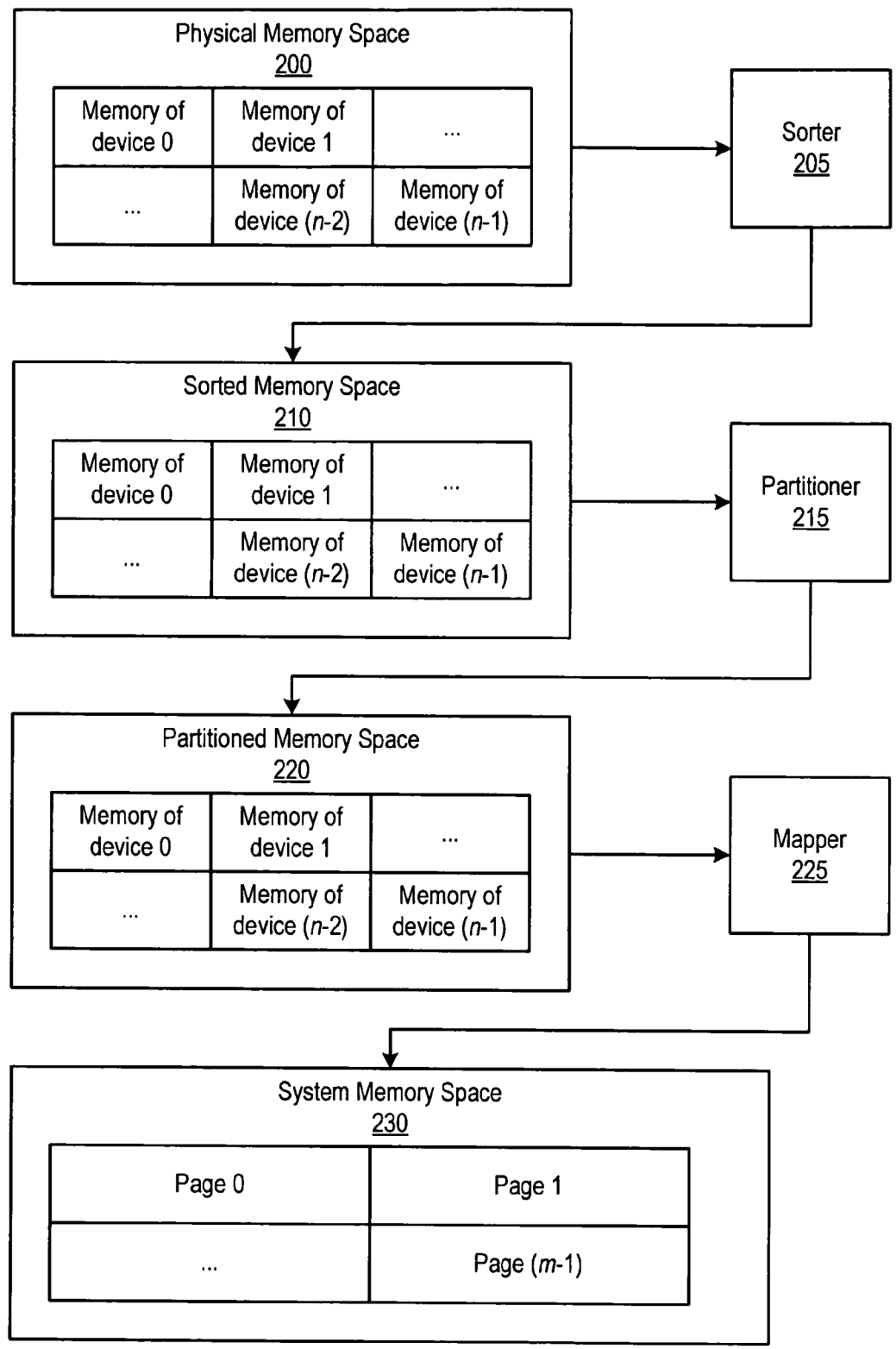
FIG. 2 illustrates an implementation of a system in accordance with one or more embodiments of the invention.

FIG. 2 illustrates an implementation of a system in accordance with one or more embodiments of the invention. In one or more embodiments of the invention, a computer system contains a physical memory space (200). The physical memory space (200) contains physical memory from some number of devices (device zero through device n−1). Each device contains one or more memory blocks, and all the memory blocks within a device form a memory pattern for that device.

In one or more embodiments of the invention, a sorter (205) groups and sorts the memory patterns in the physical memory space (200). First, the same memory patterns are grouped together. Next, the memory patterns are sorted.

One method of sorting involves basing the sort on the size of the largest memory block within each memory patterns. Of course, other well-known sorting methods may be used in an effort to optimize the process for various types of memory patterns. The sorted and grouped memory patterns form a sorted memory space (210), which is a type of virtual memory space. The sorter (205) and its operations will be described in detail below in FIG. 3A.

In one or more embodiments of the invention, a partitioner (215) partitions the memory patterns in the sorted memory space (210) based on a particular partition size. The partition size is determined according to various factors. The partitioned memory patterns form a partitioned memory space (220), which is a type of virtual memory space. The partitioner (215) and its operations will be described in detail below in FIG. 3B.

In one or more embodiments of the invention, a mapper (225) maps the partitions of all the memory patterns in the partitioned memory space (220) by performing a transpose operation on the partitions. The transposed partitions form a system memory space (230), which is a type of virtual memory space. This system memory space (230) is then used by the computer system for its operations, such as the execution of the operating system and various software programs. The mapper (225) and its operations will be described in detail below in FIG. 3C.

Figure 3A:
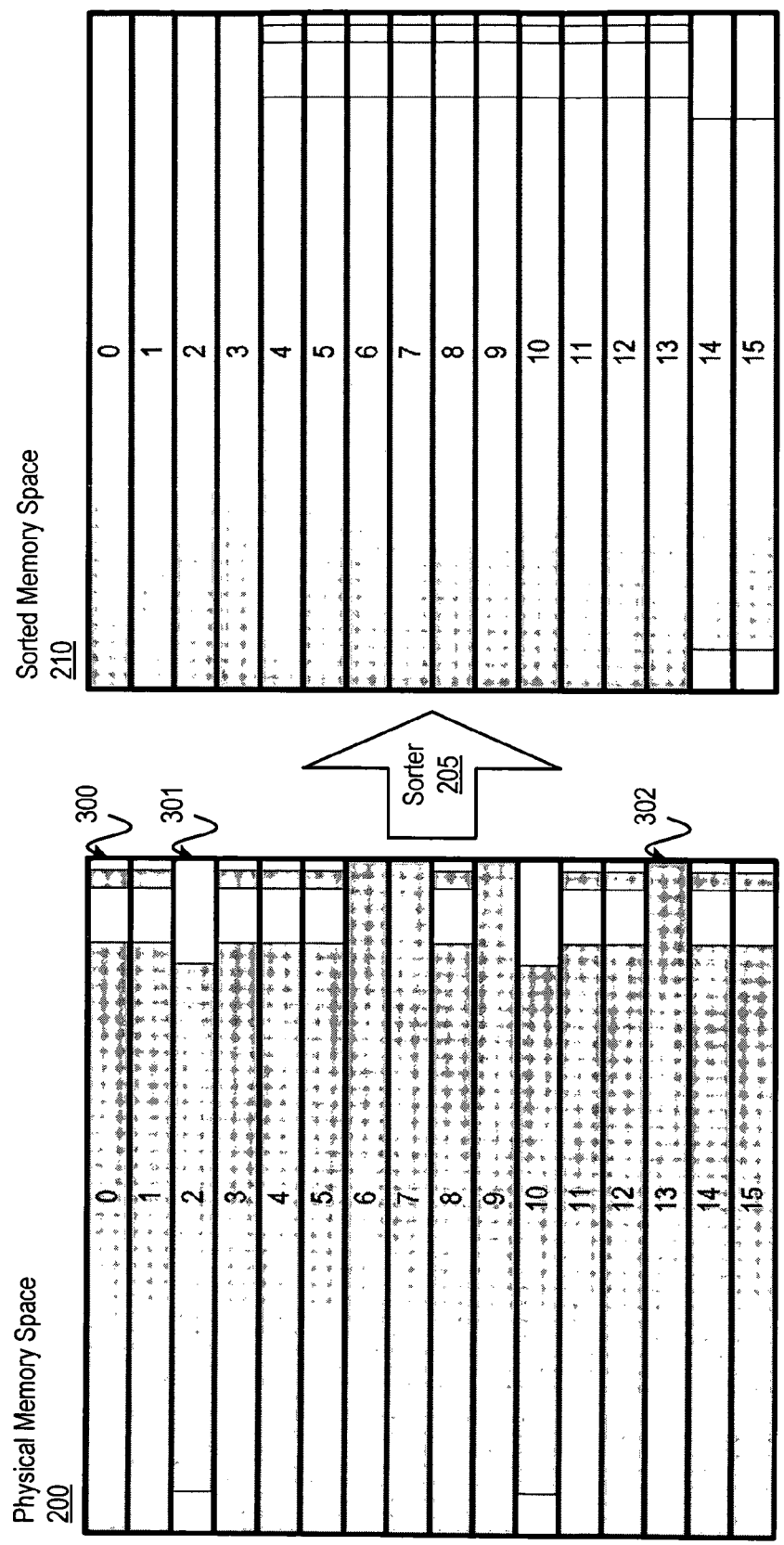
FIG. 3A-3C illustrate an implementation of a step of a system in accordance with one or more embodiments of the invention.

FIG. 3A illustrates an implementation of a step of a system in accordance with one or more embodiments of the invention. In one or more embodiments of the invention, a sample physical memory space (200) is used to illustrate the operations of the sorter (205). To simplify the discussion, there are 15 memory patterns from 15 devices in this sample physical memory space (200). The 15 rectangles represent the 15 memory patterns. The grey area(s) within the rectangles represent the memory block(s) within the memory patterns. The white area(s) represent the gaps within the memory patterns. When the instant invention is practiced in real life, the computer systems the instant invention applies to may contain hundreds, thousands, or even tens of thousands of memory patterns from as many devices.

In one or more embodiments of the invention, the 15 memory patterns in the sample physical memory space (200) in FIG. 3A have three distinct patterns. The first pattern (300) is a large memory block, followed by a gap, followed by a small memory block, and followed by a very small gap. Memory patterns 0, 1, 3, 4, 5, 8, 11, 12, 14, and 15 all have this first pattern (300). The second pattern (301) is a gap, followed by a memory block, and followed by another gap. Memory patterns 2 and 10 have this second pattern (301). The third pattern (302) is a memory block that populates the entire memory pattern. Memory patterns 6, 7, 9, and 13 all have this third pattern (302).

In one or more embodiments of the invention, the sorter (205) first groups those memory patterns in the physical memory space (200) that have the same pattern together. Thus, memory patterns 0, 1, 3, 4, 5, 8, 11, 12, 14, and 15 are grouped together. Memory patterns 2 and 10 are grouped together. In addition, memory patterns 6, 7, 9, and 13 are grouped together.

Next, the sorter (205) sorts the grouped memory patterns. One method of sorting is based on the size of the largest memory block within each memory pattern in accordance with one or more embodiments of the invention. One skilled in the art will appreciate that other methods of sorting grouped memory patterns may be used. If a memory pattern only contains one memory block, then the size of that memory block is used for the sorting. First, memory patterns 6, 7, 9, and 13 have the largest memory block, since they each contains one memory block that populates the entire memory pattern. Second, the largest memory block within each of memory patterns 0, 1, 3, 4, 5, 8, 11, 12, 14, and 15 is larger than the largest and only memory block within each of memory patterns 2 and 10. Thus, memory patterns 0, 1, 3, 4, 5, 8, 11, 12, 14, and 15 are placed after memory patterns 6, 7, 9, and 13. Finally, memory patterns 2 and 10 are placed after memory patterns 6, 7, 9, and 13 at the end.

The grouped and sorted memory patterns form the sorted memory space (210), which is a type of virtual memory space. To reiterate, memory patterns 6, 7, 9, and 13 in the physical memory space (200) conceptually become memory patterns 0-3 in the sorted memory space (210) respectively. Memory patterns 0, 1, 3, 4, 5, 8, 11, 12, 14, and 15 in the physical memory space (200) conceptually become memory patterns 4-13 in the sorted memory space (210) respectively. In addition, memory patterns 2 and 10 in the physical memory space (200) conceptually become memory patterns 14 and 15 in the sorted memory space (210) respectively.

In the above embodiment of the invention, the sorter (205) may sort and arrange the memory patterns in the decreasing size of the largest memory block within each memory pattern. In an alternative embodiment of the invention, the sorter (205) may arrange the memory patterns in a manner that will create the largest block of contiguous memory after transportation, which may be an order such that the product of the pattern's block size times the number of devices with this pattern provides the largest result. Applying this embodiment to the sample physical memory space (200) in FIG. 3A, memory patterns 2 and 10 in the physical memory space (200) would conceptually become memory patterns 0 and 1 in the sorted memory space (210) respectively, memory patterns 0, 1, 3, 4, 5, 8, 11, 12, 14, and 15 in the physical memory space (200) would conceptually become memory patterns 2-11 in the sorted memory space (210) respectively, and memory patterns 6, 7, 9, and 13 in the physical memory space (200) conceptually become memory patterns 12-15 in the sorted memory space (210) respectively.

In the above embodiment of the invention, the sorter (205) groups the memory patterns in the physical memory space (200) first, and sorts the memory patterns second. In an alternative embodiment of the invention, the sorter (205) sorts the memory patterns in the physical memory space (200) first, and groups the memory patterns second.

There are different methods to achieve the grouping and sorting of the memory patterns in the physical memory space (200) in accordance with one or more embodiments of the invention. For example, the devices that contain the memory patterns are installed into the computer system in such an order that they have already been grouped based on their respective patterns and sorted based on their respective largest memory blocks. In this case, the grouping and sorting have been done prior to the power-up of the computer system. To the operating system, the physical memory space (200) and the sorted memory space (210) would be identical.

In one or more embodiments of the invention, a simple table, also known as a "lookup table," is used to map the physical memory space (200) to the sorted memory space. The table would have the same number of entries as the number of memory patterns within the physical memory space (200). Applying this embodiment to the example in FIG. 3A, the lookup table that maps the physical memory space (200) to the sorted memory space (210) would have 15 entries with the following values (the left column are the device indices in the physical memory space (200), and the right column are the corresponding device indices in the sorted memory space (210).):

| Entry | Value |
|---|---|
| 0 | 4 |
| 1 | 5 |
| 2 | 14 |
| 3 | 6 |
| 4 | 7 |
| 5 | 8 |
| 6 | 0 |
| 7 | 1 |
| 8 | 9 |
| 9 | 2 |
| 10 | 15 |
| 11 | 10 |
| 12 | 11 |
| 13 | 3 |
| 14 | 12 |
| 15 | 13 |

Conversely, the lookup table that maps the sorted memory space (210) to the physical memory space (200) would have 15 entries with the following values (the left column are the device indices in the sorted memory space (210), and the right column are the corresponding device indices in the physical memory space (200).):

| Entry | Value |
|---|---|
| 0 | 6 |
| 1 | 7 |
| 2 | 9 |
| 3 | 13 |
| 4 | 0 |
| 5 | 1 |
| 6 | 3 |
| 7 | 4 |
| 8 | 5 |
| 9 | 8 |
| 10 | 11 |
| 11 | 12 |
| 12 | 14 |
| 13 | 15 |
| 14 | 2 |
| 15 | 10 |

Figure 3B:
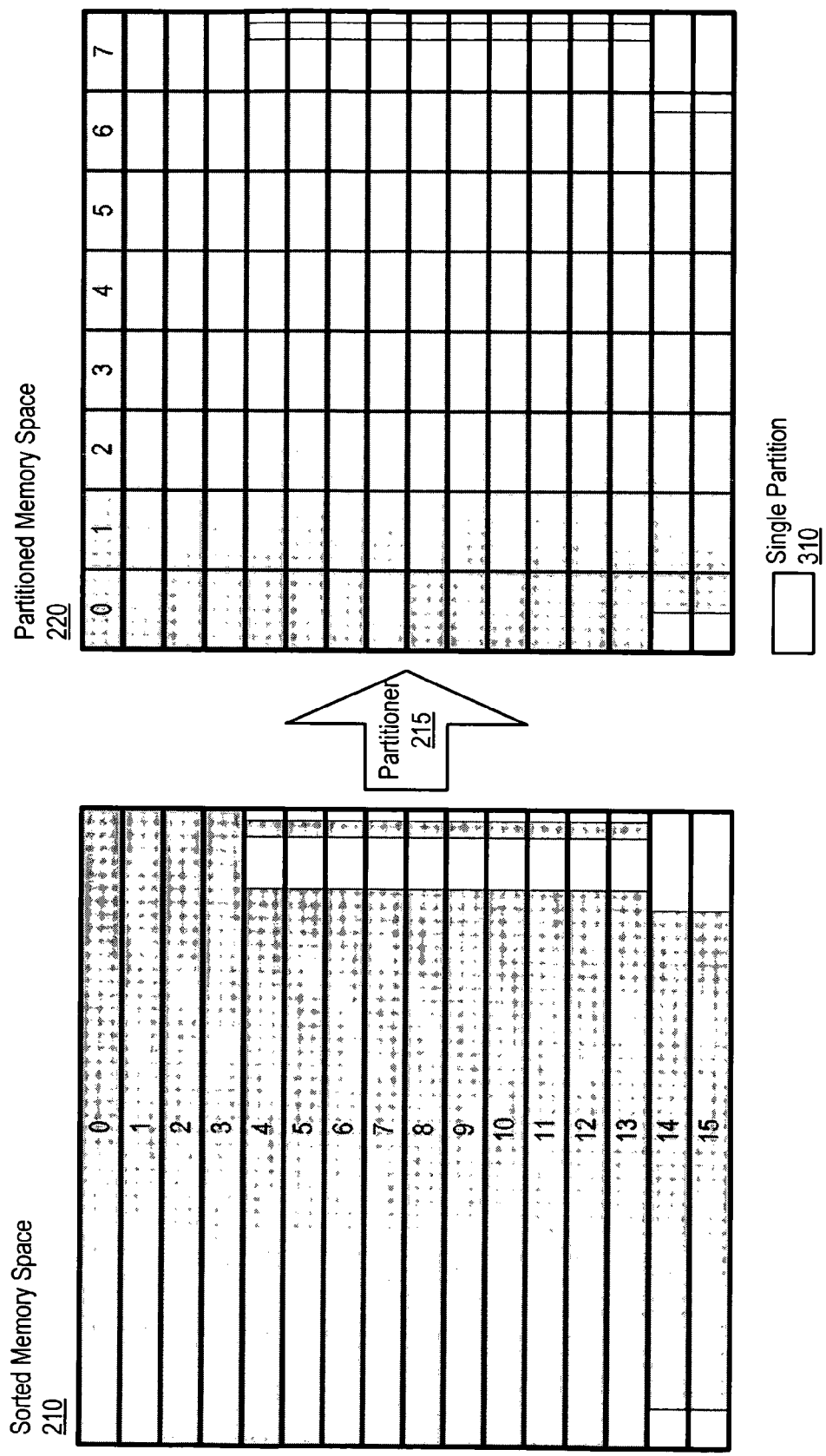

FIG. 3B illustrates an implementation of a step of a system in accordance with one or more embodiments of the invention. In one or more embodiments of the invention, a partitioner (215) partitions the grouped and sorted memory patterns in the sorted memory space (210) based on a specific partition size (310). The partition size (310) is determined based on various factors.

Technically, the partition size (310) may range from 1 byte to the maximum number of bytes the memory patterns may contain. However, in general, extremely small or large partition sizes (310) may not be desirable. For example, if the memory patterns all have more than several gigabytes (1 gigabyte=1,073,741,824 bytes) of memory, then a small partition size (310), such as 1 kilobyte (1 kilobyte=1,024 bytes), would result in too many partitions. This may cause the computer system to perform inefficiently due to the cost of managing hundreds of thousands of partitions. On the other hand, if the partition size (310) is too close to the maximum number of bytes the memory patterns may contain, then it would result in too few partitions. In this case, the benefits of the instant invention may not be fully realized, as will be shown below in FIG. 3C.

Furthermore, the partition size (310) should be divisible by all the memory patterns in the sorted memory space (210). This means that in general, a partition size (310) should be a value that is the power of 2. In addition, the partition size (310) should be determined based on the size and complexity of the computer system, the number of memory patterns within the sorted memory space (210), the maximum available size of the memory patterns, the particular needs of the operating system and software programs executing on the computer system, etc.

Once the memory patterns in the sorted memory space (210) have been partitioned, the sorted memory space (210) conceptually becomes the partitioned memory space (220). In the sample partitioned memory space (220) in FIG. 3B, each memory pattern is partitioned into 8 partitions.

Figure 3C:
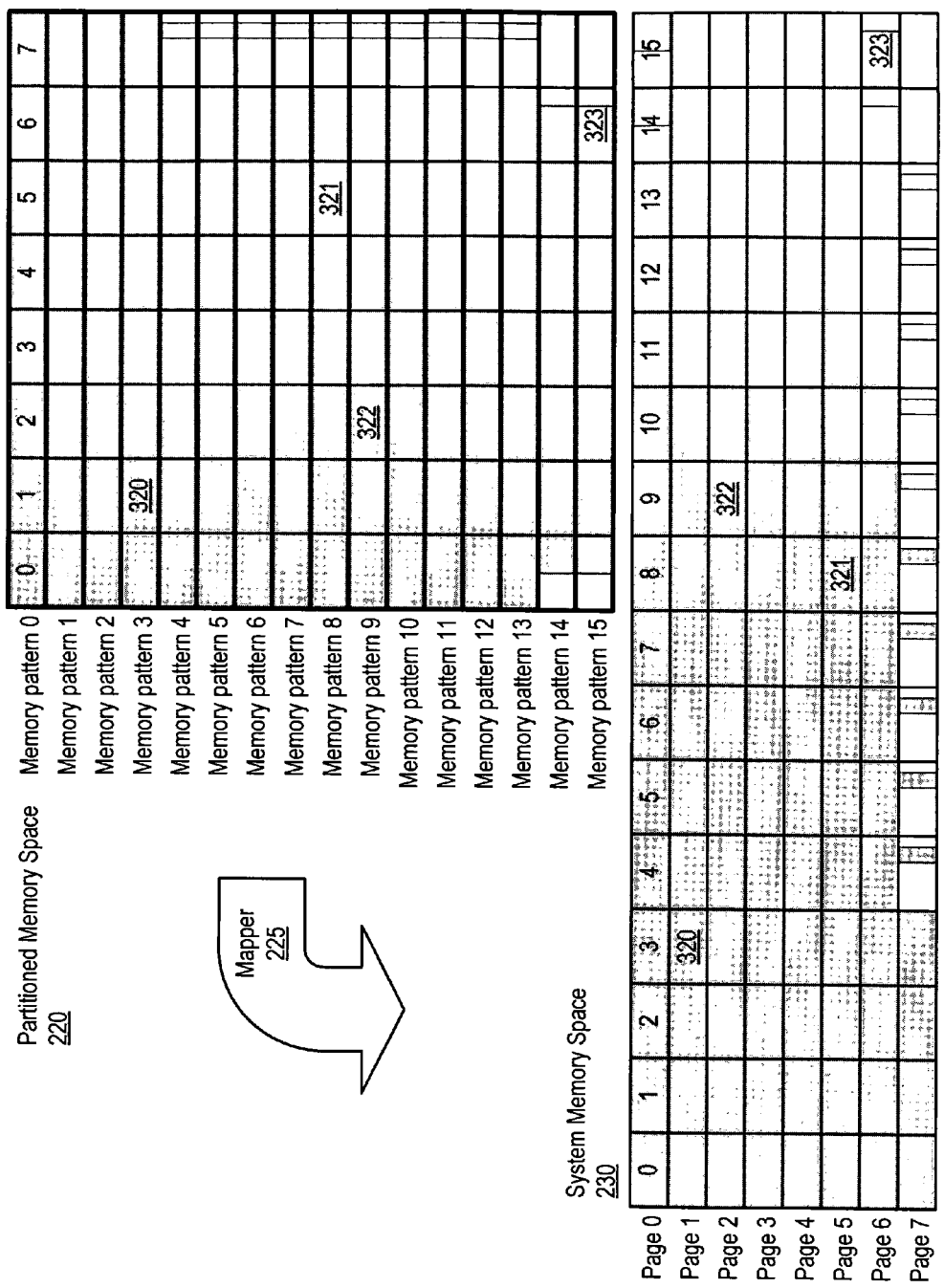

FIG. 3C illustrates an implementation of a step of a system in accordance with one or more embodiments of the invention. In one or more embodiments of the invention, a mapper (225) conceptually maps the partitions in the partitioned memory space (220) into the system memory space (230) by performing the transpose operation on the partitions within the partitioned memory space (220).

A matrix is a collection of objects arranged in rows and columns. An m-by-n matrix means that the matrix has m number of columns and n number of rows. Each object in the matrix is also referred to as an "element" of the matrix. A particular element located at column i and row j is denoted as element$_{i,j}$ or element (i, j) of the matrix.

The transpose operation as applied to a matrix is defined as $A^T=B$, when A is an m-by-n matrix, B is an n-by-m matrix, $A(i,j)=B(j,i)$, and i, j, m, and n each represents an integer greater than zero. In other words, element (i, j) in matrix A becomes element (j, i) in matrix B.

Conceptually, the partitions in the partitioned memory space (220) and the system memory space (230) form two matrices. In the example in FIG. 3C, the partitions in the partitioned memory space (230) conceptually form an 8-by-16 matrix (a total of 8 partitions per memory pattern, and a total of 16 memory patterns in the partitioned memory space (220)). After they are transposed, the partitions in the system memory space (230) conceptually form a 16-by-8 matrix (a total of 16 partitions per page, and a total of 8 pages in the system memory space (230)). Thus, partition i of memory pattern j within the partitioned memory space (220) conceptually becomes partition j of page i within the system memory space (230). Recall that "pages" are divisions the operating system makes to the virtual memory space, and the system memory space (230) is a type of virtual memory space.

To further clarify, for example, partition 1 of memory pattern 3 (320) in the partitioned memory space (220) equals partition 3 of page 1 (320) in the system memory space (230). Partition 5 of memory pattern 8 (321) in the partitioned memory space (220) equals partition 8 of page 5 (321) in the system memory space (230). Partition 2 of memory pattern 9 (322) in the partitioned memory space (220) equals partition 9 of page 2 (322) in the system memory space (230). In addition, partition 6 of memory pattern 15 (323) in the partitioned memory space (220) equals partition 15 of page 6 (323) in the system memory space (230).

Comparing the partitioned memory space (220) and the system memory space (230) in FIG. 3C, the largest contiguous segment of memory in the partitioned memory space (220) contains 39 partitions (from partition zero of memory pattern zero to partition 6 of memory pattern 4), while the largest contiguous segment of memory in the system memory space (230) contains 94 partitions (from partition zero of page 1 to partition 13 of page 6). Clearly, the largest contiguous segment of memory in the system memory space (230) is more than twice the size of the largest contiguous segment of memory in the partitioned memory space (220). Furthermore, the second largest contiguous segment of memory in the system memory space (230) contains 14 partitions (from partition zero on page zero to partition 13 on page zero), while the second largest contiguous segment of memory in the partitioned memory space (220) only contains 7 partitions (from partition zero of memory pattern 4 to partition 6 of memory pattern 4).

However, if the partition size chosen is too large, then too many partitions would contain gaps within them. That is, these partitions would be similar to partitions 14 and 15 of page zero, partitions 14 and 15 of page 6, and partitions 4-13 of page 7 in the system memory space (230). The mapping from the partitioned memory space (220) to the system memory space (230) would not significantly increase the sizes of the contiguous segments of memory.

To maximum the benefits of the instant invention, it is desirable to limit the number of different patterns of the memory patterns within the computer system, and to achieve the maximum amount of "overlapping" memory among the memory patterns. In other words, the memory should populate the same or similar range of offsets within each memory pattern. In one or more embodiments of the invention, physical memory in all the memory patterns within the computer system begin at offset zero and continue without any gap in between.

Figure 4:
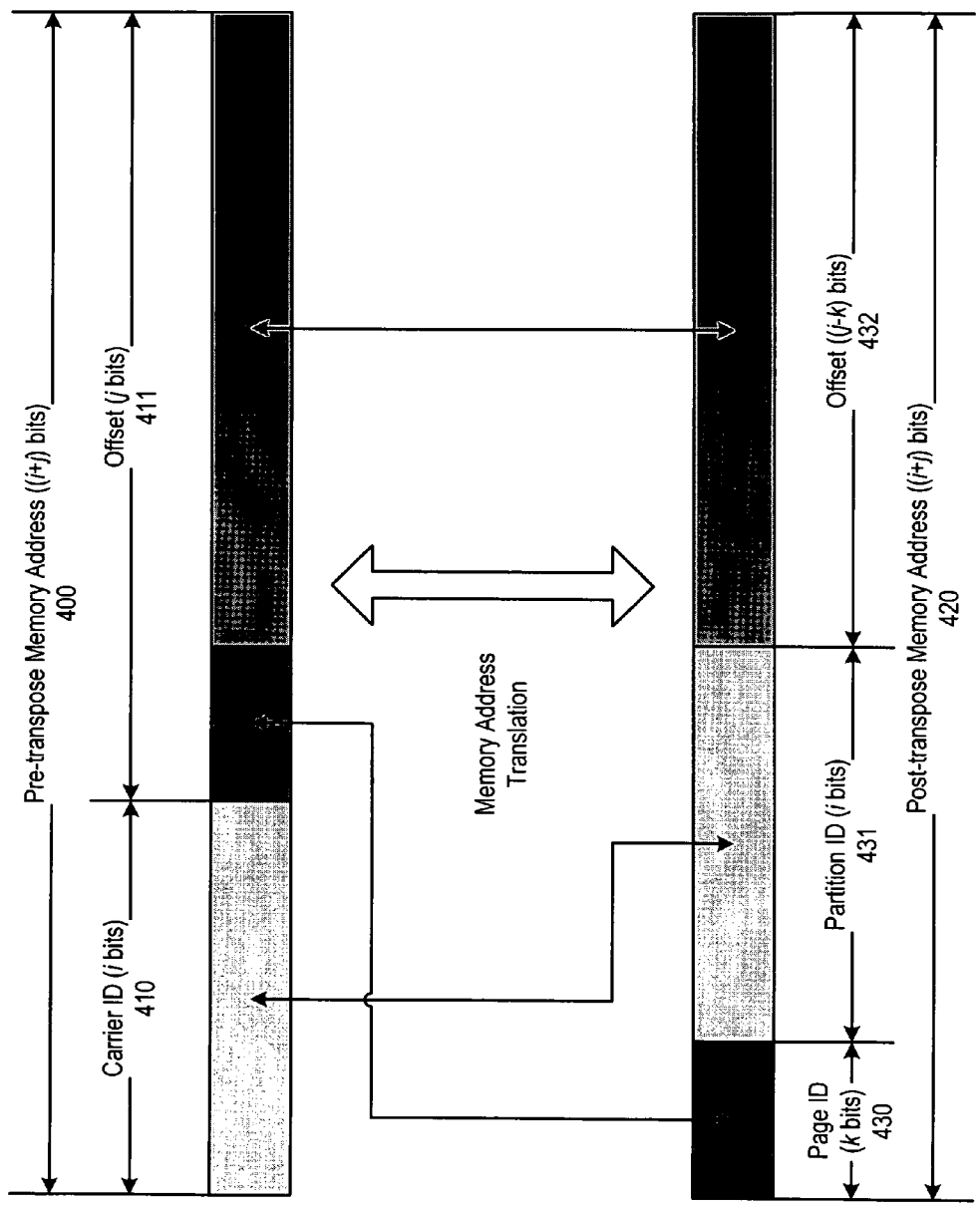
FIG. 4 illustrates an implementation of a step of a system in accordance with one or more embodiments of the invention.

FIG. 4 illustrates an implementation of a step of a system in accordance with one or more embodiments of the invention. Recall that each memory location within a memory space is assigned a unique memory address, and memory locations that have unique memory addresses assigned to are addressable memory locations. In one or more embodiments of the invention, a pre-transpose memory address (400), that is, a memory address for a memory space before the transpose operation described above in FIG. 3C, contains an i-bit Carrier ID (410) and a j-bit offset (411), where i and j each represents an integer. Thus, the pre-transpose memory address (400) contains a total of i+j bits. The Carrier ID (410) identifies which memory pattern within the memory space the memory location is from, and the offset (411) identifies which byte within the particular memory pattern the memory location is located. This was merely one embodiment of the invention, the invention also allows for the situation where there are high bits above the carrier ID which are unmodified by the mapping.

On the other hand, a post-transpose memory addresses (420), that is, a memory address for the system memory space after the transpose operation described above in FIG. 3C, contains a k-bit page ID (430), an i-bit partition ID (431), and a (j-k)-bit offset, where i, j, and k each represents an integer. The post-transpose memory address (420) also contains a total of i+j bits. The page ID (430) identifies which page within the system memory space the memory location is from, the partition ID (432) identifies which partition within the particular page the memory location is from, and the offset (432) identifies which byte within the particular partition within the particular page the memory location is located.

Recall that the partition size in FIGS. 3B and 3C above may vary based on various factors relating to the computer system. The post-transpose memory address (420) accommodates the change in partition size by varying the value of k. In other words, the value of k decreases as the partition size increases; and conversely, the value of k increases as the partition size decreases. The value of k may vary from zero to j inclusive, i.e., $zero \leq k \leq j$. Furthermore, $2^k$ equals the number of partitions within each memory pattern, and $2^{j-k}$ equals the partition size.

Recall that conventionally, the rightmost bit in a memory address is bit zero. As illustrated in FIG. 4, in one or more embodiments of the invention, to translate or map between pre-transpose memory address (400) and post-transpose memory address (420), the higher i+k bits are shifted. Specifically, to translate from pre-transpose memory address (400) to post-transpose memory address (420), bits j-k to j-1 inclusive in the pre-transpose memory address (400) are translated to bits i+j-k to i+j-1 inclusive in the post-transpose memory address (420), and bits j to i+j-1 inclusive in the pre-transpose memory address (400) are translated to bits j-k to i+j-k-1 inclusive in the post-transpose memory address (420). To translate from post-transpose memory address (420) to pre-transpose memory address (400), bits i+j-k to i+j-1 inclusive in the post-transpose memory address (420) are translated to bits j-k to j-1 inclusive in the pre-transpose memory address (400), and bits j-k to i+j-k-1 inclusive in the post-transpose memory address (420) are translated to bits j to i+j-1 inclusive in the pre-transpose memory address (400). For both translations, the lower j-k bits, bits zero to j-k-1, in both pre-transpose memory address (400) and post-transpose memory address (420) remain unchanged.

Figure 5:
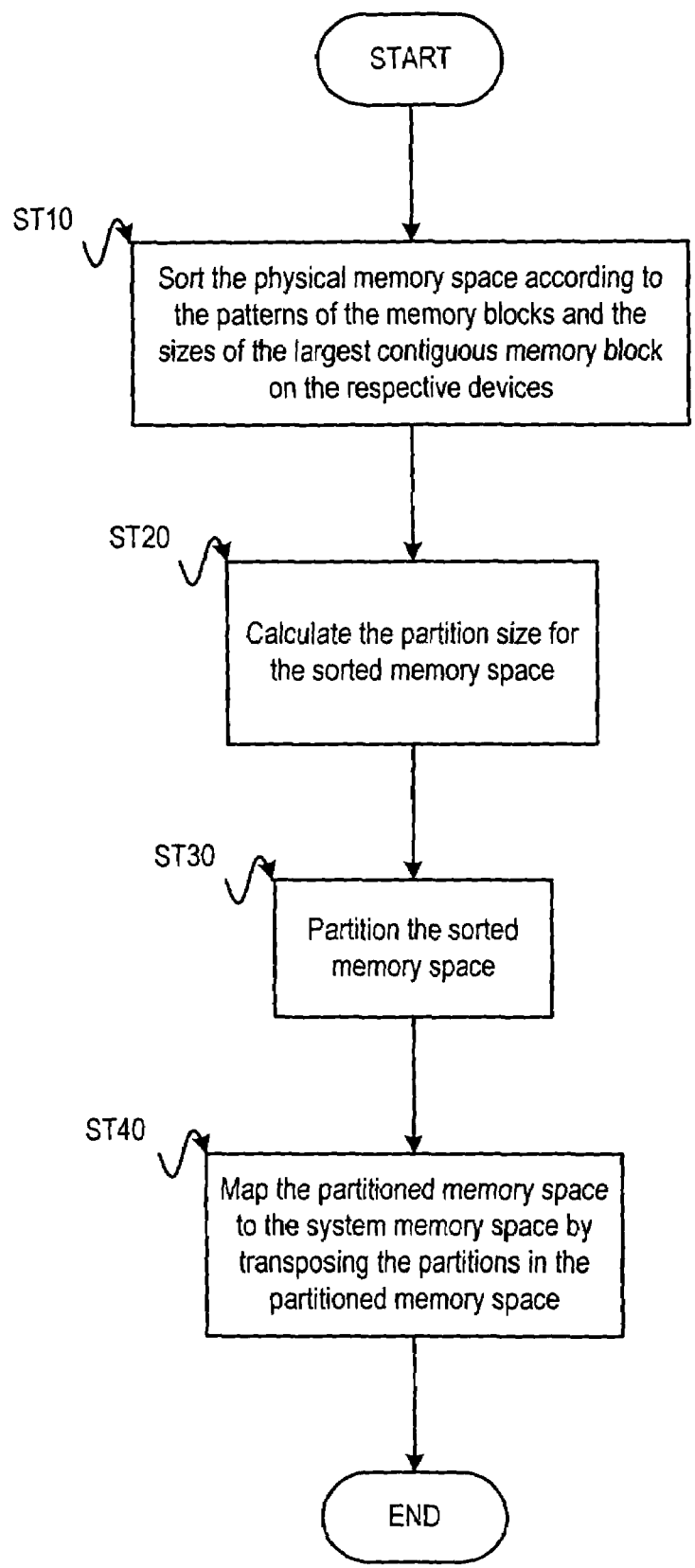
FIG. 5 shows a flowchart of a method in accordance with one or more embodiments of the invention.

FIG. 5 shows a flowchart of a method in accordance with one or more embodiments of the invention. In one or more embodiments of the invention, memory patterns within a physical memory space are first grouped based on the distinct pattern of the memory patterns such that memory patterns with the same pattern are grouped together (ST10), and then sorted based on the largest contiguous memory block within the memory patterns (ST10). The grouped and sorted memory patterns conceptually form a sorted memory space. A partition size is calculated based on the specific needs of the computer system (ST20) as described above in FIG. 3B. The memory patterns within the sorted memory space are partitioned based on the partition size (ST30). The partitioned memory patterns form a partitioned memory space. A transpose operation is performed on the partitions within the memory patterns in the partitioned memory space (ST40) as described above in FIG. 3C. The transposed partitions form a system memory space, which is then used by the computer system.

The grouping, sorting, and partitioning operations should be completed before the transposing operation. However, among themselves, it is not necessary that the grouping, sorting, and partitioning operation are performed in any particular order. In one or more embodiments of the invention, the sorting operation is performed before the grouping operation. In one or more embodiments of the invention, the grouping operation is performed before the sorting operation. In one or more embodiments of the invention, the computer system may be in such a condition that the partitioning operation should be performed before both the grouping and the sorting operation.

Figure 6:
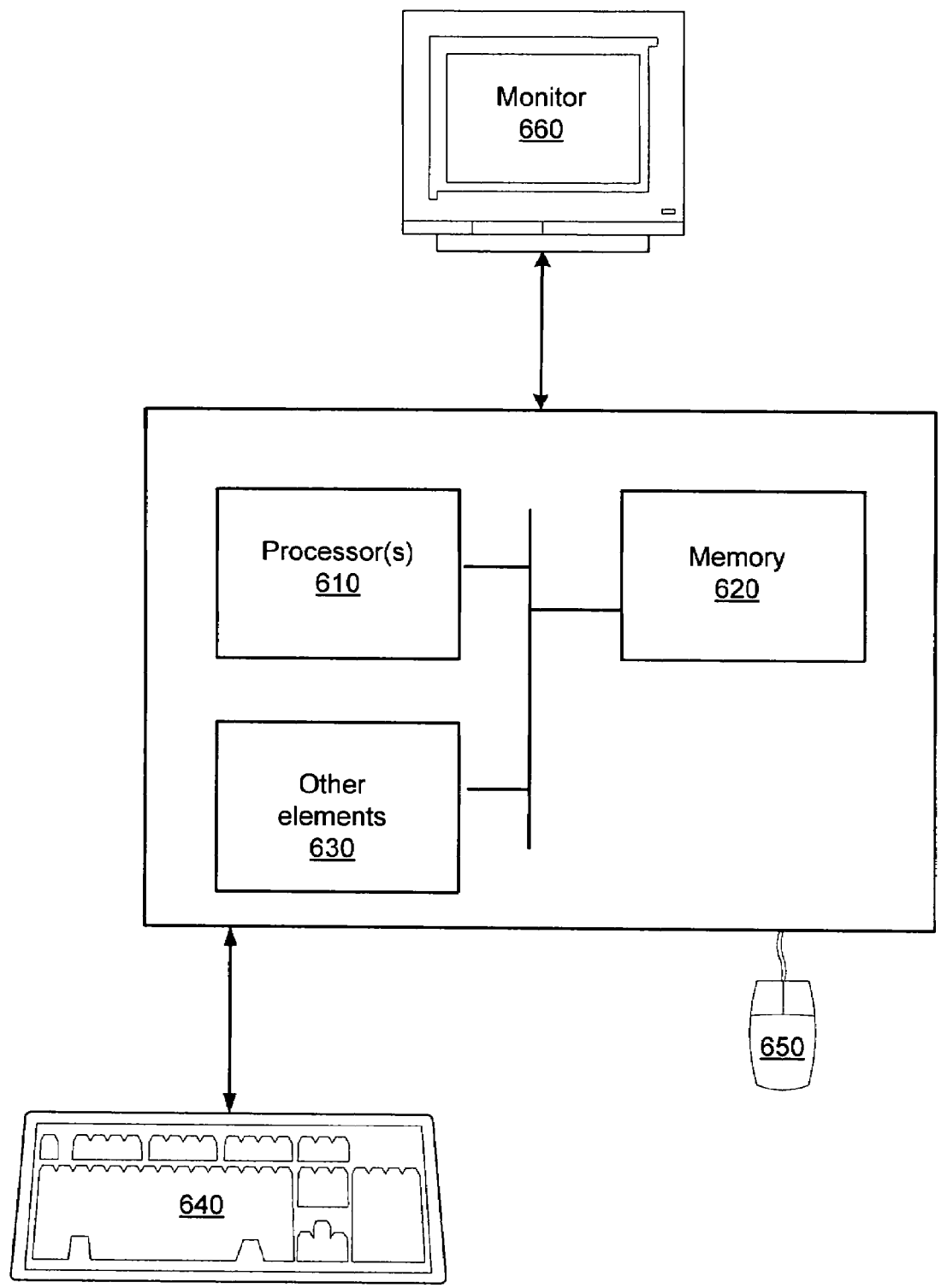
FIG. 6 shows a computer system in accordance with one or more embodiments of the invention.

One or more embodiments of the invention may be implemented on virtually any type of computer systems regardless of the platform being used. For example, FIG. 6 shows a generic model of the computer system, including a single or multiple processor(s) (610), associated memory (620), and numerous other elements (630). A keyboard (640) and a mouse (650) are connected to the computer as input devices. A monitor (660) is connected to the computer for display purposes. In this example, the memory (620) in the computer system would be equivalent to the physical memory space the instant invention applies to.

Significant benefits may be achieved when the instant invention is applied to a computer system with a large number of memory patterns, preferably hundreds or thousands, with the same or very similar patterns. Primarily, the transposing operation increases the sizes of contiguous segments of memory in the system memory space. In addition, once memory patterns are partitioned, distinct partitions are isolated from one another after the transposing operation. Erratic behavior in one part of the computer system does not disrupt the rest of the system.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A system for mapping memory of a computer system, comprising:
   a sorter for sorting a physical memory space to obtain a sorted virtual memory space,
      wherein the physical memory space comprises a plurality of memory patterns,
      wherein each of the plurality of memory patterns is associated with a physical device and comprises at least one memory block,
      wherein the at least one memory block is contiguous and addressable, and
      the plurality of memory patterns are arranged based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns;
   a partitioner for partitioning the plurality of memory patterns in the sorted memory space based on a partition size to obtain a partitioned virtual memory space; and
   a mapper for transposing the partitioned virtual memory space to obtain a system memory space used by the computer system.

2. The system of claim 1, wherein a plurality of the partitioned virtual memory space and the system memory space are represented by a matrix and are transposed to partitions on pages in the virtual memory space, wherein indexing for memory patterns, partitions, and pages begins at zero.

3. The system of claim 1, further comprising:
   a first-to-second memory address translator for translating a first memory address to a second memory address, wherein
      the first memory address comprises i+j bits;
      the second memory address comprises i+j bits;
      bits j−k to j−1 inclusive in the first memory address are translated to bits i+j−k to i+j−1 inclusive in the second memory address, and
      bits j to i+j−1 inclusive in the first memory address are translated to bits j−k to i+j−k−1 inclusive in the second memory address,
   wherein indexing for bits in the first memory address and the second memory address begins at zero and proceeds from right to left,
      i represents an integer greater than one,
      j represents an integer greater than one,
      k represents an integer between two and j inclusive,
      j−1 is greater than j−k,
      i+j−1 is greater than i+j−k,
      i+j−1 is greater than j, and
      i+j−k−1 is greater than k−k.

4. The system of claim 3, wherein bits zero to j−k−1 inclusive in the first memory address are copied to bits zero to j−k−1 inclusive in the second memory address, and wherein j−k−1 is greater than zero.

5. The system of claim 1, further comprising:
   a second-to-first memory address translator for translating a second memory address to a first memory address, wherein
      the first memory address comprises i+j bits;
      the second memory address comprises i+j bits;
      bits i+j−k to i+j−1 inclusive in the second memory address are translated to bits j−k to j−1 inclusive in the first memory address, and
      bits j−k to i+j−k−1 inclusive in the second memory address are translated to bits j to i+j−1 inclusive in the first memory address,
   wherein indexing for bits in the first memory address and the second memory address begins at zero and proceeds from right to left,
      i represents an integer greater than one,
      j represents an integer greater than one, k represents an integer between two and j inclusive,
j−1 is greater than j−k,
i+j−1 is greater than i+j−k,
i+j−1 is greater than j, and
i+j−k−1 is greater than j−k.

6. The system of claim 5, wherein bits zero to j−k−1 inclusive in the second memory address are copied to bits zero to j−k−1 inclusive in the first memory address, and wherein j−k−1 is greater than zero.

7. A computer system, comprising:
a physical memory space comprising a plurality of memory patterns, wherein each of the plurality of memory patterns is associated with a physical device and comprises at least one memory block, wherein the at least one memory block is contiguous and addressable; and
a processor for executing instructions to:
group the plurality of memory patterns with a same pattern of the at least one memory block in the physical memory space,
sort the plurality of memory patterns in the physical memory space based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns;
partition the plurality of memory patterns in the sorted memory space based on a partition size to obtain a partitioned memory space, and
transpose the partitioned virtual memory space to obtain a system memory space used by the computer system.

8. The computer system of claim 7, wherein a plurality of the partitioned virtual memory space and the system memory space are represented by a matrix and are transposed to partitions on pages in the virtual memory space, wherein indexing for memory patterns, partitions, and pages begins at zero.

9. The computer system of claim 7, further comprising:
a first memory address comprising i+j bits;
a second memory address comprising i+j bits;
a first-to-second memory address translator for translating the first memory address to the second memory address, wherein
bits j−k to j−1 inclusive in the first memory address are translated to bits i+j−k to i+j−1 inclusive in the second memory address, and
bits j to i+j−1 inclusive in the first memory address are translated to bits j−k to i+j−k−1 inclusive in the second memory address,
wherein indexing for bits in the first memory address and the second memory address begins at zero and proceeds from right to left,
i represents an integer greater than one,
j represents an integer greater than one,
k represents an integer between two and j inclusive,
j−1 is greater than j−k,
i+j−1 is greater than i+j−k,
i+j−1 is greater than j, and
i+j−k−1 is greater than j−k.

10. The computer system of claim 9, wherein bits zero to j−k−1 inclusive in the first memory address are copied to bits zero to j−k−1 inclusive in the second memory address, And wherein j−k−1 is greater than zero.

11. The computer system of claim 7, further comprising:
a first memory address comprising i+j bits;
a second memory address comprising i+j bits;
a second-to-first memory address translator for translating the second memory address to the first memory address, wherein
bits i+j−k to i+j−1 inclusive in the second memory address are translated to bits j−k to j−1 inclusive in the first memory address, and
bits j−k to i+j−k−1 inclusive in the second memory address are translated to bits j to i+j−1 inclusive in the first memory address,
wherein indexing for bits in the first memory address and the second memory address begins at zero and proceeds from right to left,
i represents an integer greater than or equal to zero,
j represents an integer greater than or equal to zero, and
k represents an integer between zero and j inclusive.

12. The computer system of claim 11, wherein bits zero to j−k−1 inclusive in the second memory address are copied to bits zero to j−k−1 inclusive in the first memory address, and wherein j−k−1 is greater than zero.

13. A computer readable medium, comprising software instructions to:
group a plurality of memory patterns with a same pattern of at least one memory block in a physical memory space, wherein each of the plurality of memory patterns is associated with a physical device and comprises at least one memory block, wherein the at least one memory block is contiguous and addressable;
sort the plurality of memory patterns in the physical memory space based on a predefined number of occurrences of each memory pattern, size of contiguous memory address ranges in each of the plurality of memory patterns, size of contiguous memory address ranges in each of the plurality of memory patterns, and arrangement of contiguous address ranges in each of the plurality of memory patterns;
partition the plurality of memory patterns in the sorted memory space based on a partition size to obtain a partitioned memory space, and
transpose the partitioned virtual memory space to obtain a system memory space used by the computer system.

14. The computer readable medium of claim 13, wherein a partition m of a memory pattern n in the partitioned memory space is transposed to a partition n on a page m in the system memory space, wherein
indexing for memory patterns, partitions, and pages begins at zero,
m represents an integer greater than or equal to zero, and
n represents an integer greater than or equal to 1.

15. The computer readable medium of claim 13, further comprising software instructions to:
translate a first memory address to a second memory address, wherein
the first memory address comprises i+j bits;
the second memory address comprises i+j bits;
bits j−k to j−1 inclusive in the first memory address are translated to bits i+j−k to i+j−1 inclusive in the second memory address, and
bits j to i+j−1 inclusive in the first memory address are translated to bits j−k to i+j−k−1 inclusive in the second memory address,
wherein indexing for bits in the first memory address and the second memory address begins at zero and proceeds from right to left,
i represents an integer greater one,
j represents an integer greater than one,
k represents an integer between two and j inclusive,
j−1 is greater than j−k, $i+j-1$ is greater than $i+j-k$,
$i+j-1$ is greater than $j$, and
$i+j-k-1$ is greater than $j-k$.

16. The computer readable medium of claim 15, further comprising software instructions to:
copy bits zero to $j-k-1$ inclusive in the first memory address to bits zero to $j-k-1$ inclusive in the second memory address, and wherein $j-k-1$ is greater than zero.

17. The computer readable medium of claim 13, further comprising software instructions to:
translate a second memory address to a first memory address, wherein
the first memory address comprises $i+j$ bits;
the second memory address comprises $i+j$ bits;
bits $i+j-k$ to $i+j-1$ inclusive in the second memory address are translated to bits $j-k$ to $j-1$ inclusive in the first memory address, and
bits $j-k$ to $i+j-k-1$ inclusive in the second memory address are translated to bits $j$ to $i+j-1$ inclusive in the first memory address,
wherein indexing for bits in the first memory address and the second memory address begins at zero and proceeds from right to left,
$i$ represents an integer greater than one,
$j$ represents an integer greater than one,
$k$ represents an integer between two and $j$ inclusive,
$j-1$ is greater than $j-k$,
$i+j-1$ is greater than $i+j-k$,
$i+j-1$ is greater than $j$, and
$i+j-k-1$ is greater than $j-k$.

18. The computer readable medium of claim 17, further comprising software instructions to:
copy bits zero to $j-k-1$ inclusive in the second memory address to bits zero to $j-k-1$ inclusive in the first memory address, and wherein $j-k-1$ is greater than zero.

* * * * *

UNITED STATES PATENT AND TRADEMARK OFFICE
CERTIFICATE OF CORRECTION

| | |
|---|---|
| PATENT NO. | : 7,478,119 B2 |
| APPLICATION NO. | : 11/480703 |
| DATED | : January 13, 2009 |
| INVENTOR(S) | : Michael H. Paleczny et al. |

It is certified that error appears in the above-identified patent and that said Letters Patent is hereby corrected as shown below:

In Claim 3, Column 14 (line 46), please replace "k – k" with "j – k".

Signed and Sealed this

Third Day of March, 2009

JOHN DOLL
*Acting Director of the United States Patent and Trademark Office*